United States Patent [19]

King

[11] Patent Number: 5,363,623
[45] Date of Patent: Nov. 15, 1994

[54] SIDING PANEL AND SUPPORT STRIP ASSEMBLY

[76] Inventor: Daniel W. King, 113 N. Ohio Ave., Suite 208, Sidney, Ohio 45365

[21] Appl. No.: 990,038

[22] Filed: Dec. 14, 1992

[51] Int. Cl.⁵ .............................................. E04D 1/00
[52] U.S. Cl. ....................................... 52/520; 52/545
[58] Field of Search .................. 52/520, 529, 545, 547; 403/363, 375

[56] References Cited

U.S. PATENT DOCUMENTS

| | | |
|---|---|---|
| 2,126,676 | 8/1938 | Thomas .................................. 52/520 |
| 2,820,535 | 1/1958 | Hutchison . |
| 3,214,876 | 11/1965 | Mattes . |
| 3,226,901 | 1/1966 | Harter . |
| 3,417,531 | 12/1968 | Jones . |
| 3,520,099 | 7/1970 | Mattes . |
| 3,552,078 | 1/1971 | Mattes . |
| 4,096,679 | 6/1978 | Naz . |
| 4,102,106 | 7/1978 | Golder et al. . |
| 4,669,238 | 6/1987 | Kellis et al. . |
| 4,672,788 | 6/1987 | Van Tosh .......................... 52/520 X |
| 4,947,609 | 8/1990 | Champagne ...................... 52/520 X |

Primary Examiner—Peter M. Cuomo
Assistant Examiner—Jerry Redman
Attorney, Agent, or Firm—Jacox & Meckstroth

[57] ABSTRACT

An elongated siding panel and a longitudinally extending panel attachment and support strip have overlapping edge portions with longitudinally spaced slots receiving corresponding hook-shaped tabs to form loose positive connections. The slots have a length longer than the tabs to provide for limited longitudinal movement of the panel relative to the support strip. The panel and strip are preferably formed from an extruded flat strip of semi-rigid plastics material, and the continuously formed panel and support strip are progressively notched at longitudinally spaced intervals to form the slots and tabs. The notched support strip is progressively severed from the panel, twisted on a longitudinal axis, and the tabs are progressively inserted into the slots for hooking the overlapping edge portion of the panel.

15 Claims, 2 Drawing Sheets

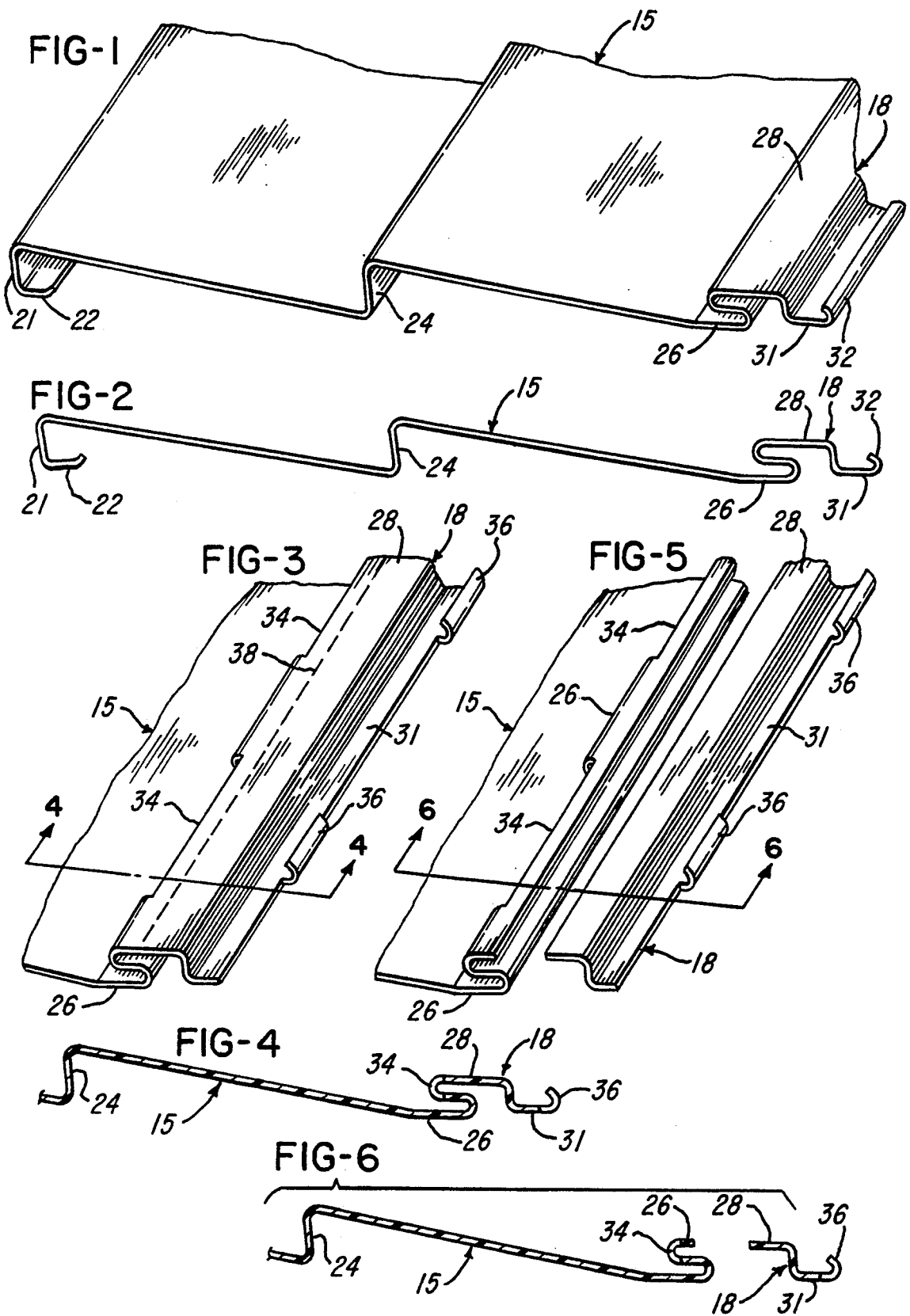

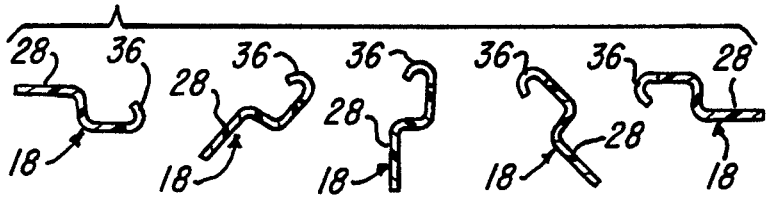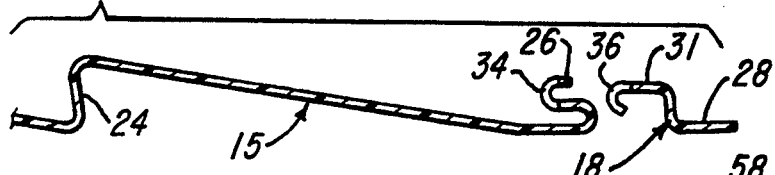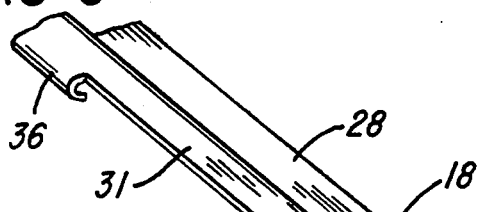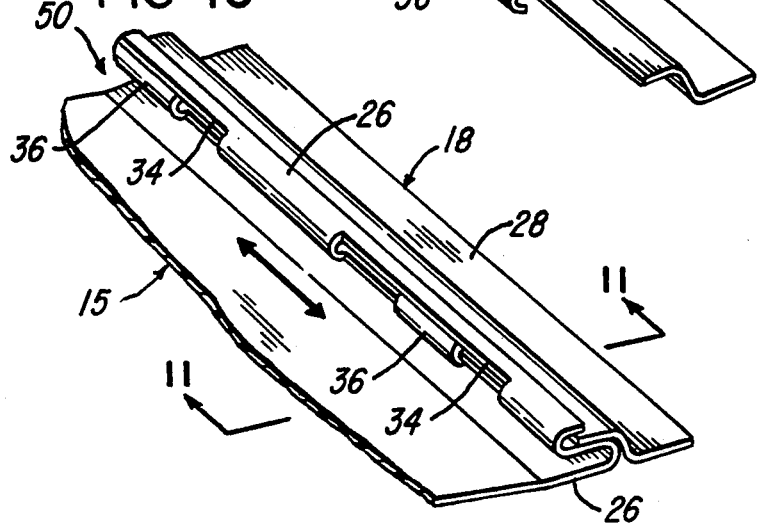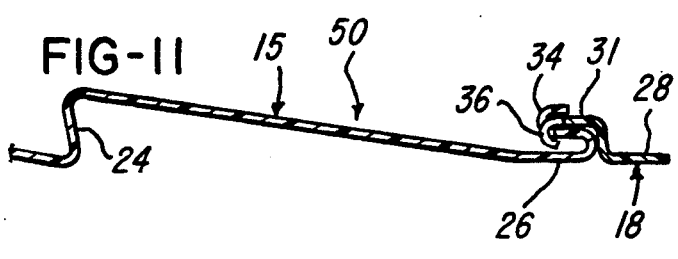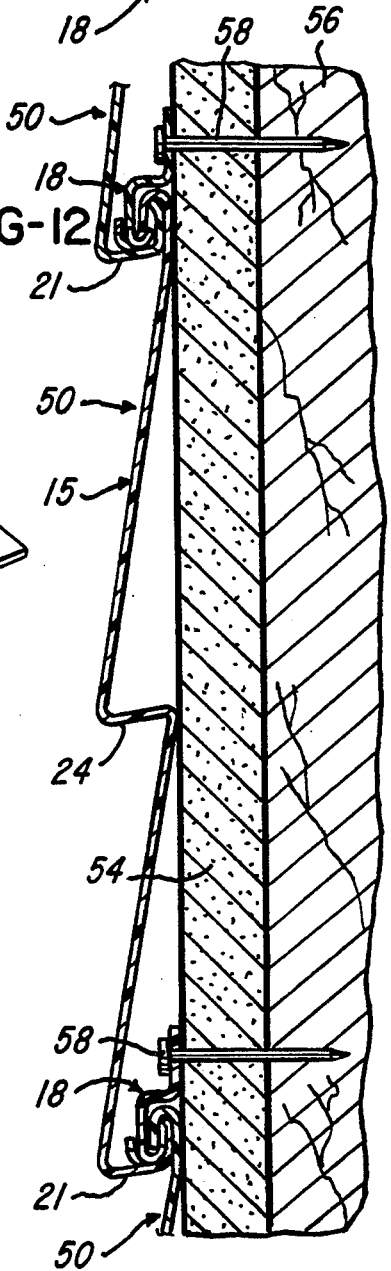

SIDING PANEL AND SUPPORT STRIP ASSEMBLY

BACKGROUND OF THE INVENTION

In the production of elongated siding panels of extruded polyvinylchloride (vinyl) or similar plastics materials, it is highly desirable to provide for attaching the siding panels in an overlapping manner to the outer surface of the building so that each panel may expand and contract longitudinally with changes in environmental temperature. For example, it is possible for a 12' siding panel of extruded vinyl to change in length by as much as ⅜" due to thermal expansion and contraction. In some forms of extruded vinyl siding panels, for example, as disclosed in U.S. Pat. No. 3,520,099 and No. 4,102,106, the upper edge portion of each panel is provided with longitudinally extending and longitudinally spaced slots through which fasteners or nails are inserted for supporting the siding panel and for attaching the panel to the outer surface of a building. Preferably, the nails are not tightly driven so that the panel is free to shift or expand and contract longitudinally relative to the nails without causing the panel to buckle or distort. However, with such panels, it is difficult to use a power driven nailer and precisely control the force applied by each nail head against the upper edge portion of the siding panel.

It has also been known to support the upper edge portions of siding panels with longitudinally spaced clips which are positively nailed to the outer surface of the building, for example, as disclosed in U.S. Pat. No. 2,820,535 and No. 3,226,901. If properly constructed and installed, the clips may provide for longitudinal thermal expansion and contraction of each panel relative to the clips. However, such clips are manually attached to the upper edge portion of each siding panel prior to or during installation of the panel and thus require additional labor and time for installing overlapping siding panels on the outer surface of the building.

Overlapping vinyl siding panels have also been installed on the outer surface of a building with the use of longitudinally extending support strips of extruded plastics material or roll-formed metal, for example, as disclosed in U.S. Pat. No. 3,214,876, No. 3,417,531, No. 3,552,078, No. 4,096,679 and No. 4,669,238. The separate support strips are usually attached to the siding panels after production of the panels or immediately prior to installing the panels onto the outer surface of a building. These longitudinally extending support strips add significantly to the cost of the siding panel and also require additional labor and time for installing the overlapping siding panels. In addition, if the support strips are free to slide longitudinally relative to their corresponding siding panels, each panel must be carefully handled during transport and installation.

In above-mentioned U.S. Pat. No. 4,669,238, in which the applicant herein is a co-inventor, a roll-formed or extruded metal support strip is provided with a deformation or dimple at each end of the support strip. The dimples cooperate with notches within the corresponding end portions of the siding panel to limit longitudinal movement of each support strip relative to its supporting siding panel during handling and installing the siding panels. When it is necessary to cut a siding panel to a shorter length, the siding panel should be renotched, and the support strip redimpled and cut at a slightly shorter length to provide for overlapping end portions of longitudinally adjacent panels.

SUMMARY OF THE INVENTION

The present invention is directed to an improved siding and attachment and support strip assembly and a method for continuously and efficiently producing the assembly. The method of the invention eliminates the need for any labor for handling of the support strip and for connecting the support strip to its corresponding siding panel. The panel and strip assembly of the invention also provides for loose connections of the support strip to the siding panel to accommodate irregularities in a wall surface, and the connections provide for limited longitudinal movement of the siding panel relative to the support strip to permit free thermal expansion and contraction of the siding panel after installation without any deforming or distorting the panel.

The assembly of invention and its method of production also minimize the volume of plastics material required for producing the siding panel and support strip and permits the siding panel and support strip to be cut to any length without releasing the support strip from the support panel. The continuous support strip may also be attached to the outer surface of a building with the use of a power driven nailer at any location along the length of the strip, and the siding panel and support strip are preferably formed from an extruded flat sheet or strip of plastics material to permit high speed production of the siding panel and support strip.

In accordance with a preferred embodiment of the invention, an extruded flat vinyl sheet or strip is directed through a forming die for continuously producing a siding panel with a longitudinally extending upper edge portion integrally connected to a panel attachment and support strip. The edge portion of the integral panel and the support strip is notched at longitudinally spaced intervals to form longitudinally spaced slots and corresponding hook-shaped tabs. The support strip is then progressively severed or separated from the siding panel after which the support strip is twisted on a longitudinal axis by 180°, and the tabs are snap-fitted into the slots which have a length longer than the tabs. Thus the siding panel and support strip assembly is continuously and automatically produced on the extrusion line. The extruded panel and strip assembly is then notched and cut at longitudinally spaced intervals, for example, 12 to 14 feet, so that each elongated panel carries its corresponding attachment and support strip.

Other features and advantages of the invention will be apparent from the following description, the accompanying drawings and the appended claims.

BRIEF DESCRIPTION OF THE DRAWINGS

FIG. 1 is a fragmentary perspective view of siding panel and support strip formed from an extruded flat sheet of plastics material in accordance with the invention;

FIG. 2 is an end view of the formed siding panel and integrally connected support strip shown in FIG. 1;

FIG. 3 is a fragmentary perspective view of the siding panel and support strip shown in FIGS. 1 and 2 and after a progressive notching operation;

FIG. 4 is a fragmentary section of the siding panel and support strip, as taken generally on the line 4—4 of FIG. 3;

FIG. 5 is a fragmentary perspective view of the siding panel and support strip shown in FIGS. 1-4 and with the support strip severed or separated from the siding panel;

FIG. 6 is a fragmentary section of the siding panel and separated support strip, as taken generally on the line 6—6 of FIG. 5;

FIG. 7 illustrates a progressive twisting operation of the support strip shown in FIG. 6;

FIG. 8 is a fragmentary section similar to FIG. 6 but with the support strip shown after being rotated 180°;

FIG. 9 is a fragmentary perspective view of the support strip shown in FIGS. 7 & 8;

FIG. 10 is a fragmentary perspective view of the sitting panel and support strip shown in FIG. 8 and after assembly;

FIG. 11 is a fragmentary section of the assembly, taken generally on the line 11—11 of FIG. 10; and FIG. 12 is a fragmentary vertical section of a wall on which is installed overlapping siding panels and corresponding support strips each produced in accordance with the invention.

DESCRIPTION OF THE PREFERRED EMBODIMENT

FIGS. 1-11 illustrate the progressive steps for continuously producing a siding panel and support strip assembly in accordance with the invention from an extruded flat sheet or strip of rigid plastics material such as polyvinylchloride (vinyl). As the flat strip is extruded from an extruder head and is still hot, the strip is directed through tooling which forms the flat strip into a continuous siding panel 15 and an integrally connected support strip 18, and having the combined profile shown in FIG. 2. The vinyl siding panel 15 includes a lower hook-shaped or channel-like end portion 21 having a return flange 22, an intermediate Z-shaped center portion 24 and a S-shaped portion 26. The support strip 18 includes a flat flange portion 28 extending from the portion 26 and an offset flange portion 31 terminating with a hook-shaped edge portion 32.

Referring to FIGS. 3-5, as the integrally extruded and formed siding panel 15 and support strip 18 are water cooled as they move away from the extruder head and forming tooling, the S-shaped portion 26 of the siding panel 15 and the hook-shaped edge portion 32 of the support strip 18 are cut out or notched at longitudinally spaced intervals with rotary notching wheels (not shown) to form longitudinally spaced slots 34 and corresponding longitudinally spaced hook-shaped tabs 36. Each tab 36 is located longitudinally within the center of the corresponding slot 34 which is approximately twice as long as the tab 36, and the tabs 36 and slots 34 are longitudinally spaced at intervals of between 2 and 3 inches. As the next progressive step of the continuous operation, the support strip 18 with the longitudinally spaced tabs 36 is severed or separated from the S-shaped portion 26 of the continuous siding panel 15 along a shear line 38 (FIG. 3). The support strip 18 is then shifted laterally from the panel portion 26, as shown in FIGS. 5 and 6 with the aid of guide shoes (not shown). The guide shoes then progressively rotate or twist the support strip 18 by 180° on a longitudinal axis, as illustrated in FIG. 7 so that the hook-shaped tabs 36 oppose the corresponding slots 34 within the S-shaped portion 26 of the siding panel 15. The support strip is then progressively shifted laterally towards the panel portion 26, and the hook-shaped tabs 36 are forced inwardly into the slots 34 by the guide shoes. The upper wall of the S-shaped portion 26 at each slot 34 is cammed or deformed upwardly in a spring-like manner until the tabs 36 enter the slots and hook onto the intermediate wall of the S-shaped portion 26, as shown in FIGS. 10 and 11. Thus, the support strip 18 is progressively reconnected to the siding panel 15 with each hook-shaped tab 36 located within the center of its corresponding longer slot 34 for continuously producing a siding panel and support strip assembly 50 (FIGS. 10 and 11).

As the assembly 50 is being continuously produced at a predetermined rate, for example, one hundred feet per minute, the assembly 50 is cut transversely at longitudinally spaced intervals with a traveling punch or saw, for example, at intervals of 12 or 14 feet for successively producing elongated siding panel and support strip assemblies 50 each having the desired length. As apparent from FIG. 10, after the cross cutting operation, the siding panel 15 of each elongated assembly 50 is free to shift longitudinally relative to its corresponding longitudinally extending attachment or support strip 18. The extent of relative movement is determined by the length of the tabs 36 in relation to the length of the slots 34 in which the ends of the slots 34 provide stop means for the tabs 36. For example, the relative longitudinal movement may be limited to approximately one inch. While the slots 34 and tabs 36 are illustrated with square end surfaces, the notching operation may be performed with rotary punches which form curved end surfaces at the ends of each slot and tab.

Referring to FIG. 12, the siding panel and support strip assembly 50 is shown mounted on an outer wall surface formed by rigid installation sheeting 54 secured or nailed to horizontally spaced vertical studs 56. The assembly 50 shown in FIG. 12 forms a course between an upper overlapping assembly 50 and a lower overlapped assembly 50. As also shown in FIG. 12, each assembly 50 is attached to the wall surface by a series of longitudinally spaced fasteners or nails 58 which are driven through the flange portion 28 of each mounting strip 18 and through the sheeting 54 into the wood studs 56. The nails 58 may be driven tightly, for example, with a power driven nailer. If desired, the flange portion 28 of each mounting strip 18 may be prepunched to form longitudinally spaced horizontal slots for receiving the nails 58. As also shown in FIG. 12, when an assembly 50 is installed above another assembly 50 previously installed, the return flange 22 of the lower edge portion 21 of the siding panel 15 projects upwardly in snap-fit relation into the upper edge portion 26 of the lower adjacent siding panel 15 and behind the tabs 36 of the support strip 18 of the lower assembly 50. This snap-fit interlocking connection positively attaches the lower edge portion 21 of each siding panel 15 to the wall surface.

From the drawings and the above description, it is apparent that a siding panel and support strip assembly constructed in accordance with the present invention, provides desirable features and advantages. For example, the interlocking or interfitting connections of the tabs 36 on the support strip 18 with the upper edge portion 26 of the corresponding siding panel 15, permits the siding panel to shift longitudinally or horizontally relative to its support strip 18 in response to thermal expansion and contraction. As also shown in the drawings, the spacing between the adjacent hook-shaped tabs 36, forming the series of longitudinally spaced interconnected portions, is less than the width of the panel 15 so that the interfitting connections permit each siding panel 15 to carry its corresponding attachment or support strip 18 regardless of the length of the siding panel. As a result, the support strip 15 requires no separate handling or manual connection to the corresponding siding panel and thus permits rapid and efficient installation of a plurality of siding panels 15 in an overlapping and interconnected manner on a wall surface, as shown in FIG. 12.

It is also apparent that the support strip 18 may be cut or notched at smaller longitudinally spaced intervals along the length of each siding panel 15. This results in each siding panel 15 being supported by a series of support strips each of which may be attached firmly to the wall surface since each strip section has substantially smaller and independent thermal expansion and contraction. Also, since the support strip 18 is not exposed directly to the sun, its maximum temperature is not as high as the siding panel 15 when it is exposed, and therefore the strip does not have the same degree of thermal expansion and contraction.

Another feature is provided by the loose fit of the tabs 36 of the support strip 18 with the edge portion 26 of the corresponding siding panel 15. This loose fit permits the support strip 18 to conform to irregularities in the outer wall surface without distorting the upper edge portion 26 of the siding panel 15. The interconnection of the support strip 18 and siding panel 15 with the tabs 36 also permits the assembly 50 to be cut at any desired length without releasing the support strip 18 from the siding panel 15. Preferably, the opposite end portions of each support strip 18 are precut or notched during continuous production so that the end portions of each siding panel 15 project beyond the ends of the corresponding support strip 18, in a manner as shown in above-mentioned U.S. Pat. No. 4,669,238, to provide for overlapping the end portions of longitudinally adjacent siding panels 15.

A further important feature is provided by the method of continuous and simultaneous extrusion and production of the siding panel 15 and the support strip 18. That is, the assembly 50 is produced with the minimum of vinyl or plastics material and preferably at a relatively high speed from an extruded flat sheet or strip so that no labor is required and the production costs of the assembly 50 are minimized. Moreover, since the siding panel 15 and support strip 18 are both formed from the same extruded material, any scrap produced during start-up or production of the assemblies 50 may be conveniently reground and reused, which also helps in minimizing the cost of production.

While the form of panel and strip assembly and its method of production herein described constitute a preferred embodiment of the invention, it is to be understood that the invention is not limited to the precise form and method described, and that changes may be made therein without departing from the scope and spirit of the invention as defined in the appended claims. For example, the siding panel 15 and the support strip 18 could be formed from two separate extrusions and not initially formed from a single extrusion.

The invention having thus been described, the following is claimed:

1. A siding panel and support strip assembly, comprising an elongated siding panel including longitudinally extending upper and lower portions providing said panel with a contoured cross-sectional configuration, a longitudinally extending support strip and including an upper portion adapted to receive a series of longitudinally spaced fasteners, means defining a series of longitudinally spaced slots and corresponding hook-shaped tabs within said support strip and said upper portion of said panel, said tabs projecting into said slots and forming positive connections of said support strip to said panel for supporting said panel by said support strip, and said slots each having a length longer than the length of the corresponding said tab to provide for limited longitudinal movement of said panel relative to said support strip to provide for thermal expansion and contraction of said panel while providing for convenient handling and rapid installation of said panel.

2. An assembly as defined in claim 1 wherein said upper portion of said panel includes a channel portion having said slots, and said longitudinally spaced tabs project downwardly through said slots.

3. An assembly as defined in claim 1 wherein said panel and said support strip comprise extrusions of plastics material and have substantially the same uniform wall thickness.

4. An assembly as defined in claim 1 wherein said upper portion of said siding panel has generally an S-shaped cross-sectional configuration and defines said longitudinally spaced slots.

5. An assembly as defined in claim 4 wherein said support strip includes said longitudinally spaced tabs, and said tabs project downwardly through said slots and engage said upper portion of said panel.

6. An assembly as defined in claim 5 wherein said lower portion of said siding panel comprise a channel portion, and said channel portion is adapted to cover said slots and tabs of another said assembly located thereabove.

7. An assembly as defined in claim 1 wherein said siding panel and said support strip comprise separate sections of a single extrusion of plastics material.

8. An assembly as defined in claim 1 wherein said siding panel and said support strip each comprises a formed section of a substantially flat extrusion of plastics material.

9. An assembly as defined in claim 1 wherein said upper portion of said siding panel has an inverted U-shaped channel portion connected to a U-shaped channel portion, said latter channel portion defines said longitudinally spaced slots, and said support strip includes said hook-shaped tabs projecting downwardly through the corresponding said slots.

10. A siding panel and support strip assembly, comprising an elongated siding panel of plastics material and including longitudinally extending upper and lower portions providing said panel with a contoured cross-sectional configuration, a longitudinally extending support strip of the same said plastics material and including an upper portion adapted to receive a series of longitudinally spaced fasteners, said siding panel and said support strip comprising longitudinal separate sections severed from the same single extrusion of said plastics material, means for positively connecting said support strip to said panel for supporting said panel by said support strip, and said connecting means including a series of longitudinally spaced hook members and stop means for limiting the longitudinal movement of each hook member in either direction, providing for longitudinal movement of said panel relative to said support strip to provide for thermal expansion and contraction of said panel while minimizing the cost of producing said panel and support strip assembly.

11. An assembly as defined in claim 10 wherein said upper portion of said siding panel defines a series of longitudinally spaced slots forming said stop means, said support strip includes a corresponding series of longitudinally spaced tabs forming said hook members and projecting through said slots and engaging said upper portion of said siding panel, and said slots each having a length longer than the length of the corresponding said tab to provide for said longitudinal movement of said panel relative to said support strip.

12. An assembly as defined in claim 10 wherein said siding panel and said support strip each comprises a formed section of a substantially flat said extrusion of said plastics material.

13. An assembly as defined in claim 10 wherein said upper portion of said siding panel has an inverted U-shaped channel portion connected to a U-shaped channel portion, said latter channel portion defines a series of longitudinally spaced slots forming said stop means, and said support strip includes a corresponding series of said hook members projecting downwardly through the corresponding said slots to form said connecting means.

14. A siding panel and support strip assembly, comprising an elongated siding panel including longitudinally extending upper and lower portions providing said panel with a contoured cross-sectional configuration, an elongated support strip extending along the length of said panel and including longitudinally extending upper and lower portions, said upper portion of said support strip being adapted to receive a series of longitudinally spaced fasteners for attaching said support strip to a wall surface, said upper portion of said panel and said lower portion of said support strip including a series of longitudinally spaced interconnected portions disposed substantially along the entire length of said panel and forming a series of longitudinally spaced supports for said panel along substantially the entire length of said panel, and said interconnected portions each including a hook member and stop means for limiting longitudinal movement of said hook member, providing for limiting longitudinal movement of said panel in either direction relative to said support strip to provide for thermal expansion and contraction of said panel while providing for convenient handling and rapid installation of said panel.

15. An assembly as defined in claim 14 wherein said lower portion of said support strip includes said longitudinally spaced hook-shaped tabs forming the corresponding said interconnected portions.

* * * * *

UNITED STATES PATENT AND TRADEMARK OFFICE
CERTIFICATE OF CORRECTION

PATENT NO. : 5,363,623

DATED : November 15, 1994

INVENTOR(S) : Daniel W. King

It is certified that error appears in the above-identified patent and that said Letters Patent is hereby corrected as shown below:

Column 3, line 13, delete "sitting" and insert -- siding --.

Claim 15, column 8, line 23, delete "hook-shaped tabs" and insert -- hook members --.

Signed and Sealed this

Tenth Day of January, 1995

BRUCE LEHMAN

*Attest:*

*Attesting Officer*   *Commissioner of Patents and Trademarks*